United States Patent [19]

Wakefield

[11] 4,103,937

[45] Aug. 1, 1978

[54] SELF-ALIGNING PERMANENT FITTING

[75] Inventor: Fancher B. Wakefield, Holbrook, N.Y.

[73] Assignee: Grumman Aerospace Corporation, Bethpage, N.Y.

[21] Appl. No.: 745,386

[22] Filed: Nov. 26, 1976

[51] Int. Cl.² ............................................. F16L 17/00
[52] U.S. Cl. .................................. 285/110; 285/332.1; 285/334.4; 285/382
[58] Field of Search ............ 285/382, 261, 184, 332.1, 285/322, 334.4, 323, 255, 382.2, 421, 110; 403/281, 282, 279, 274; 29/520, 511; 85/321

[56] References Cited

U.S. PATENT DOCUMENTS

| 826,431 | 7/1906 | Jones | 285/382 X |
| 2,044,444 | 6/1936 | Pond | 85/32.1 X |
| 2,332,893 | 10/1943 | Clickner | 285/382 X |
| 2,704,678 | 3/1955 | Klein et al. | 285/382 X |
| 3,891,246 | 6/1975 | Hopper | 285/184 X |

FOREIGN PATENT DOCUMENTS

| 538,635 | 6/1955 | Belgium | 285/332.1 |
| 510,417 | 9/1920 | France | 285/261 |
| 434,908 | 10/1926 | Fed. Rep. of Germany | 285/382 |
| 522,993 | 4/1931 | Fed. Rep. of Germany | 285/382 |

Primary Examiner—Dave W. Arola
Attorney, Agent, or Firm—Richard G. Geib; Mellor A. Gill

[57] ABSTRACT

A coupling of two members having spherical sealing surfaces to accommodate misalignment of conduits coupled thereby which coupling has one member having a cylindrical portion mechanically maintaining the coupling with the other member having a surface to cooperate with the cylindrical portion.

5 Claims, 5 Drawing Figures

U.S. Patent
Aug. 1, 1978
4,103,937
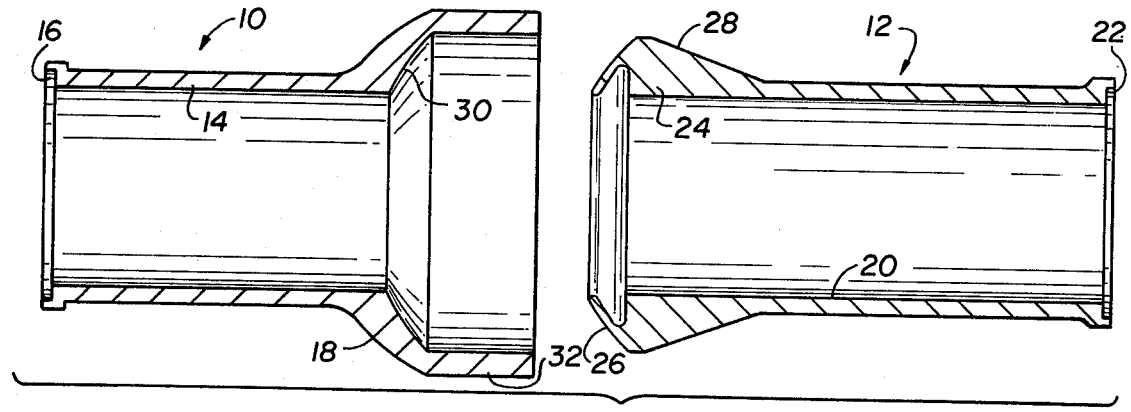
FIGURE 1
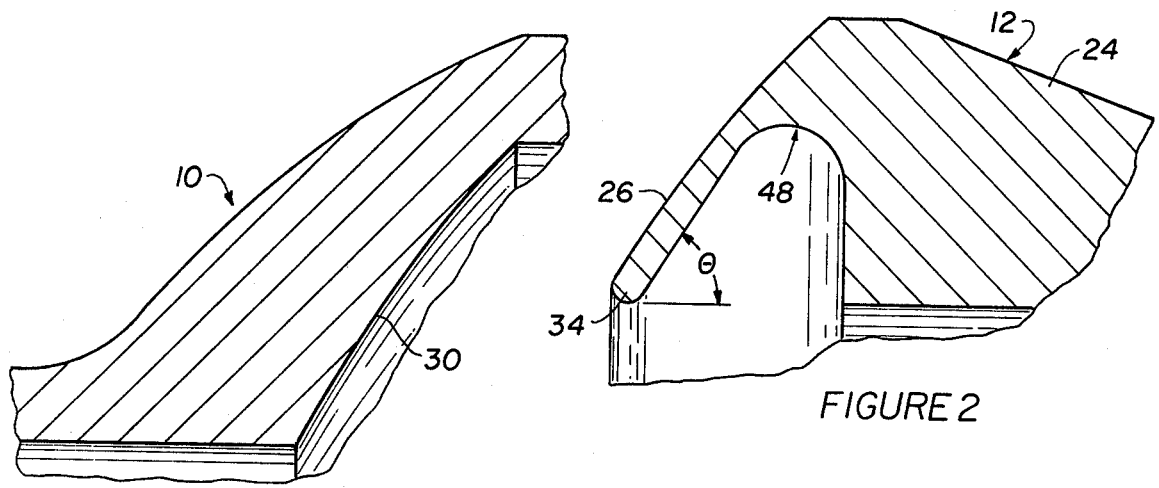
FIGURE 3
FIGURE 2
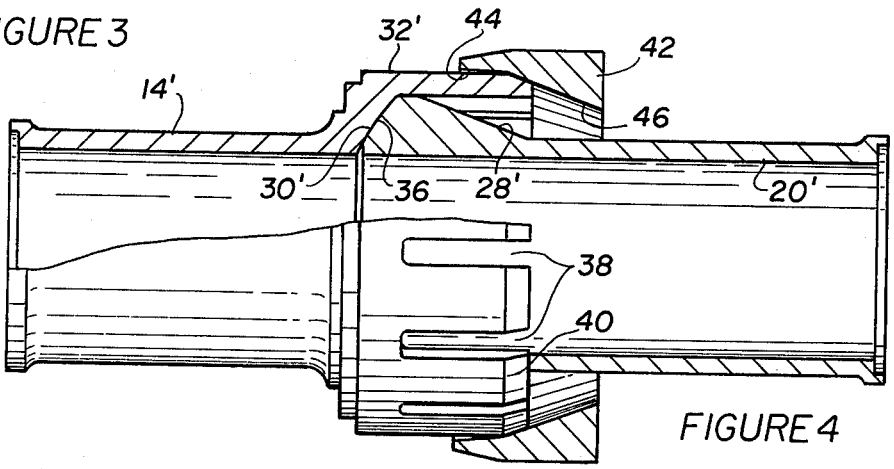
FIGURE 4
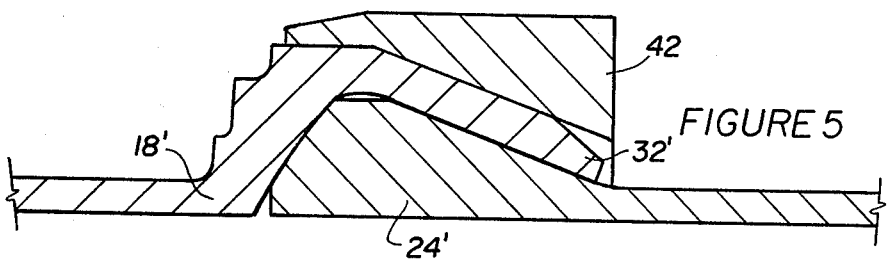
FIGURE 5

SELF-ALIGNING PERMANENT FITTING

BACKGROUND

The past decade has seen the introduction of non-detachable couplings for fluid conduits. This has been especially true in aerospace and aircraft applications where maintenance of structural integrity is of utmost concern. The problem that is addressed is that with detachable couplings in addition to the weight penalty of large coupling nuts and unions needed for thread integrity there is always the likelihood of inadvertent uncoupling slight or complete, overtorqued assembly with consequent seat damage of the sealing portions, and a need to inspect the coupling elements for potential fatigue failures or defects in manufacture.

In addressing these problems the prior art has attempted to utilize permanent type fittings joined together as by brazing, welding, silver soldering and mechanical swaging. This invention will be principally concerned with improving the latter but its teaching will be equally applicable to prior art bonded couplings.

U.S. Pat. Nos. 3,474,519 and 3,848,451 show mechanical swaging tools and couplings made thereby. Another noted prior art coupling akin to that of this invention is disclosed by U.S. Pat. No. 3,556,567. These permanent couplings and others known to be more available in the marketplace such as those using the Aeroquip braze process and the Raychem Cryofit process have a common fault that limits their applicability. That is these couplings cannot tolerate even the slightest misalignment between the tubes to be coupled thereby. Recent analysis show that operational loadings with any degree of misalignment in prior art couplings have led to accelerated tube failures. This has been attributed to the pre-stress moment created by misalignment and to the additive effect of stresses in the tubing due to vehicle vibrations, etc.

It is, therefore, a principal object of this invention to bring to the art a self-aligning permanent type fitting which does not induce tube failure by assembly of misaligned tubes.

SUMMARY OF INVENTION

The coupling of this invention is provided by a spherical sealing surface in contact with a corresponding spherical sealing surface and held thereto by a swaged connection of a cylindrical portion of the former, acting as a socket for the latter, with a surface of the body for said corresponding spherical surface.

DRAWING DESCRIPTIONS

FIG. 1 is an exploded cross-sectioned view of elements for a coupling in accordance with this invention;

FIG. 2 is an enlarged partial cross section of the seat area of one of the elements of FIG. 1;

FIG. 3 is an enlarged partial cross section of the seat area of another of the elements of FIG. 1;

FIG. 4 is a cross section of another embodiment of this invention shown prior to coupling; and FIG. 5 is a partial cross section of the embodiment of FIG. 4 in the coupled attitude.

DETAILED DESCRIPTION

With more particular reference to FIG. 1 the coupling of this invention is shown to comprise two elements 10 and 12. Element 10 has a body 14 adapted to receive and be joined to a fluid conduit (tube) within recess 16 at one end and to open in a bell-mouth or socket 18 at the other end.

The element 12, on-the-other-hand has a body 20 similarly having a receiving recess 22 for a tube to be joined thereto at one end and a bulbous seat portion 24 at the other end. In this particular embodiment the element 12 is made by machining a hollow stock to leave end 24 with its spherical surface 26 and cam surface 28. Element 14 could also be machined from thicker cross sectioned stock so as to provide socket 18 with an internal spherical surface 30 transitioning the area between body 14 and a cylindrical projecting portion 32.

As seen in larger detail by FIG. 2 the end 24 is machined to provide a flexible lip 34 having a free standing angle $\theta$ with the axis of the element 12. The spherical surface 26 is machined on the lip on a predetermined radius from the axis of element 12 and finished to a predetermined surface smoothness.

As for the element 10, the spherical surface 30 is similarly formed about a radius from the axis of the element. However, this radius will be different in this embodiment from that for lip 34, preferably a greater radius.

Turning now to another embodiment for this invention it is seen by FIG. 4 that the element 14' is essentially the same as in FIG. 1. Element 20' is, however, different. Instead of a flexible lip spherical seat there is used in this form of the invention, for lower pressure couplings, a bulbous ball-like seat 36 which has a face machined as a spherical surface having the same radius as socket surface 30'. In this embodiment the cylindrical portion 32' is castellated, as at 38, with tapered ends 40. A lock ring 42 having an outwardly divergent engaging surface 44 is moved over cylindrical projection 32' until the inwardly divergent surface 46 is resting on the tapered end 40. Thereafter a swaging tool such as is shown by U.S. Pat. No. 3,474,519 is used to force lock ring 42 to cause cylindrical projection 32' to conform to cam surface 28' of element 20' whereby end 24' is sealingly forced into abutment with bell-mouth 18'. Spherical surfaces 36 and 30' accommodate axial misalignment of elements 14' and 20'. The actual assembled attitude is shown by FIG. 5.

In one embodiment of the structure of FIG. 1 the surface 26 was formed to have a radius of curvature of 0.680 inch, and indentation 48 was cut substantially deep into the inside surface of the end 24 within 0.018 inch of the surface 26 leaving flexible lip 34 at an angle $\theta$ of 57°. The lip 34 is long enough such that the surface 26 in its abutment with surface 30, caused by swaging 32 on cam or ramp 28, is contacting same from inward end of the lip to the peripheral extent, at ramp 28, regardless of alignment of 14 and 20. Actually misalignment within ± 3° was acceptable in this embodiment with surface 30 having a radius of curvature of 0.750 inch.

It should also be noted that in a useful embodiment of the structure of FIG. 4 the surfaces 36 and 30' could have substantially the same radius of curvature. In both the structure of FIG. 1 and FIG. 4 the surface 28 is at 20° from the horizontal to provide desired forward bias in seating surfaces 26 and 30 and 36 and 30'. The seating bias is also further assisted by internal pressure within indentation 48 of the structure of FIG. 2.

Those skilled in the art will recognize that modifications may be made in the aforedescribed coupling means according to this invention without departing from the spirit of the invention as defined in the appended claims.

I claim:

1. Coupling means capable of connecting two sections of high pressure fluid carrying conduit, said coupling comprising:

a socket element having one end adapted to receive and thereby be a continuation of a first conduit to be coupled, said socket element having a bell mouth including an integral cylindrical projection extending about and from a concave interior spherical sealing surface having a predetermined radius and located a predetermined distance inwardly of the end of the cylindrical projection;

a bulbous seat element having one end adapted to receive and thereby be a continuation of a second conduit, said bulbous seat element having a body, a flexible lip on the other end having a convex exterior spherical sealing surface of another predetermined radius, said flexible lip being on an integral raised portion of said body to snuggly fit within the cylindrical projection of the socket element, and a cam surface fairing the raised portion to the body behind the flexible lip of the second seat element, said cam surface being on an incline that will allow said cylindrical projection of said socket element in contact with said cam surface of said bulbous seat element to draw said socket element and said bulbous seat element together regardless of angular misalignment such that said concave interior spherical surface and said convex exterior spherical surface have an uninterrupted abutting contact one with the other over a wide expanse determined by the contact force of the cylindrical projection on the cam surface to solely maintain the sealed integrity of the coupling means at the contact of the flexible lip and concave sealing surface.

2. The coupling means of claim 1 wherein the cylindrical projection is castellated.

3. The coupling means of claim 1 wherein the interior spherical sealing surface and the exterior sealing surface have substantially matching surface curvature to provide the widest possible contact area therebetween when in contact.

4. The coupling means of claim 1 wherein the bulbous seat element's spherical sealing surface has a larger radius of curvature than the socket element's spherical sealing surface to provide a defined contact area therebetween when in contact.

5. The coupling means of claim 4 wherein a lock ring having an interior inclined surface substantially parallel to the cam surface is driven over said cylindrical projection to wedge contact of said cylindrical projection on said cam surface to hold an inward bias on said flexible lip.

* * * * *